(12) United States Patent
Desjoyeaux et al.

(10) Patent No.: US 11,655,044 B2
(45) Date of Patent: May 23, 2023

(54) REAR FAIRING FOR A TURBOJET ENGINE PYLON MADE OF COMPOSITE MATERIALS

(71) Applicant: Safran Nacelles, Gonfreville l'Orcher (FR)

(72) Inventors: Bertrand Desjoyeaux, Moissy Cramayel (FR); Sylvain Sentis, Moissy Cramayel (FR); Arnaud Delehouze, Moissy Cramayel (FR); François Taillard, Moissy Cramayel (FR)

(73) Assignee: Safran Nacelles, Gonfreville L'Orcher (FR)

( * ) Notice: Subject to any disclaimer, the term of this patent is extended or adjusted under 35 U.S.C. 154(b) by 893 days.

(21) Appl. No.: 16/549,359

(22) Filed: Aug. 23, 2019

(65) Prior Publication Data

US 2020/0010206 A1    Jan. 9, 2020

Related U.S. Application Data

(63) Continuation of application No. PCT/FR2018/050443, filed on Feb. 23, 2018.

(30) Foreign Application Priority Data

Feb. 23, 2017   (FR) ...................... 1751461

(51) Int. Cl.
*B64D 29/02* (2006.01)
*C04B 35/80* (2006.01)
(Continued)

(52) U.S. Cl.
CPC ............ *B64D 29/02* (2013.01); *C04B 35/117* (2013.01); *C04B 35/18* (2013.01); *C04B 35/565* (2013.01); *C04B 35/80* (2013.01); *D03D 15/00* (2013.01); *D03D 15/275* (2021.01); *D03D 25/005* (2013.01); *C04B 2235/5224* (2013.01); *C04B 2235/5228* (2013.01); *C04B 2235/5244* (2013.01); *C04B 2235/5248* (2013.01); *C04B 2235/5256* (2013.01); *D10B 2101/08* (2013.01);
(Continued)

(58) Field of Classification Search
None
See application file for complete search history.

(56) References Cited

U.S. PATENT DOCUMENTS 7,943,227 B2    5/2011   Connelly
2009/0098321 A1   4/2009   Zielinski et al.
(Continued)

FOREIGN PATENT DOCUMENTS

EP    2583900    4/2013

OTHER PUBLICATIONS

International Search Report for International Application PCT/FR2018/050443, dated May 17, 2018.

*Primary Examiner* — Shawn McKinnon
(74) *Attorney, Agent, or Firm* — Burris Law, PLLC

(57) ABSTRACT

An rear fairing for a pylon supporting an aircraft turbojet engine forms an aerodynamic surface covering the base of the pylon. The rear fairing is elongated in a longitudinal direction and includes a floor arranged opposite the hot gases exiting the turbojet engine and side walls constituting aerodynamic surfaces. The floor and the side walls include ceramic matrix composite materials made from preforms formed by layers of superimposed warp and weft yarns, the preforms have interlayer weaving yarns connecting the layers to one another.

14 Claims, 3 Drawing Sheets

(51) Int. Cl.
  *D03D 25/00*  (2006.01)
  *D03D 15/00*  (2021.01)
  *C04B 35/117* (2006.01)
  *C04B 35/18*  (2006.01)
  *C04B 35/565* (2006.01)
  *D03D 15/275* (2021.01)

(52) U.S. Cl.
  CPC ...... *D10B 2101/12* (2013.01); *D10B 2505/02* (2013.01)

(56) References Cited

U.S. PATENT DOCUMENTS

| | | |
|---|---|---|
| 2011/0155847 A1 | 6/2011 | Journade et al. |
| 2013/0333793 A1 | 12/2013 | Dambrine et al. |
| 2016/0368616 A1 | 12/2016 | Aten |

Fig. 5
Fig. 6
Fig. 6a
Fig. 7
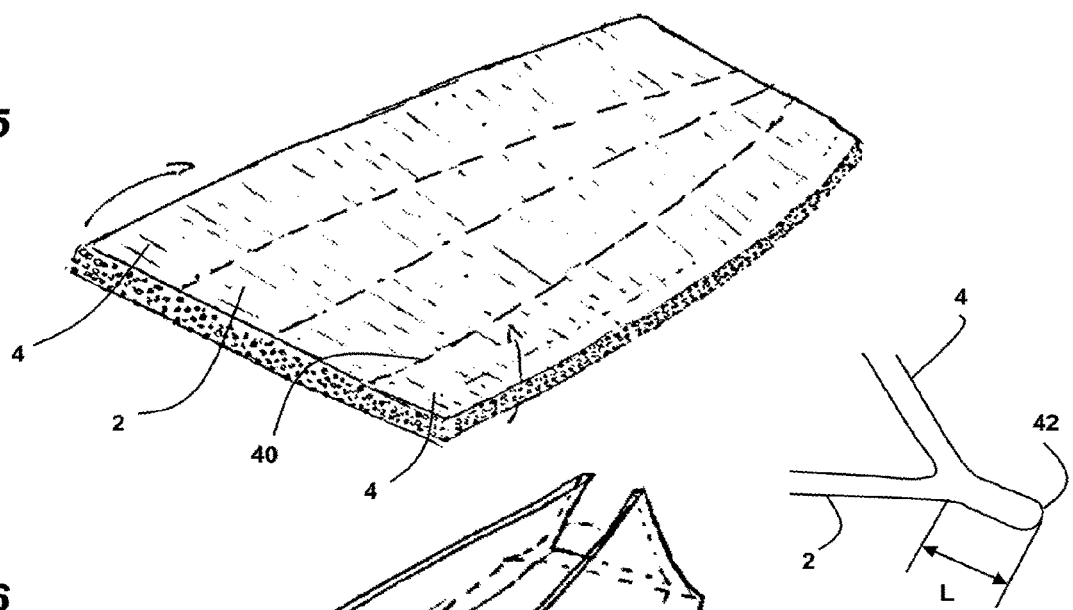
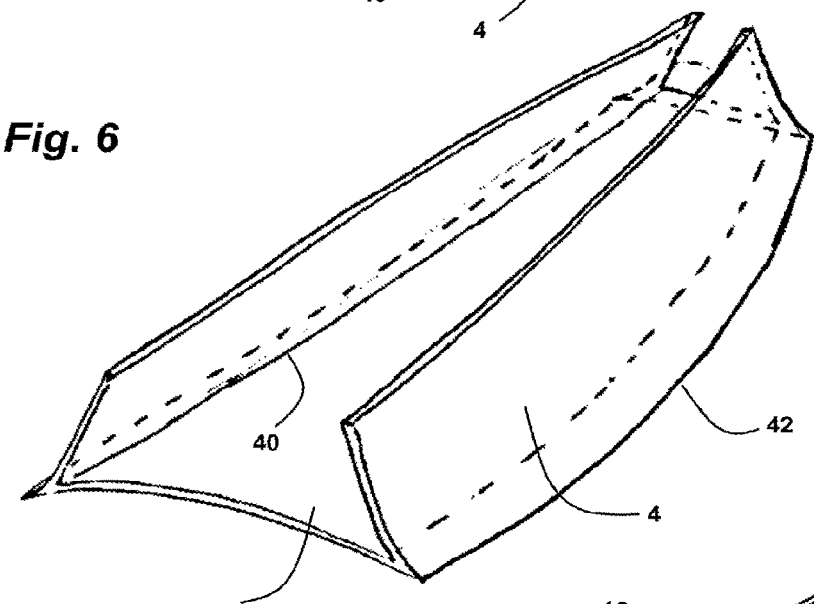
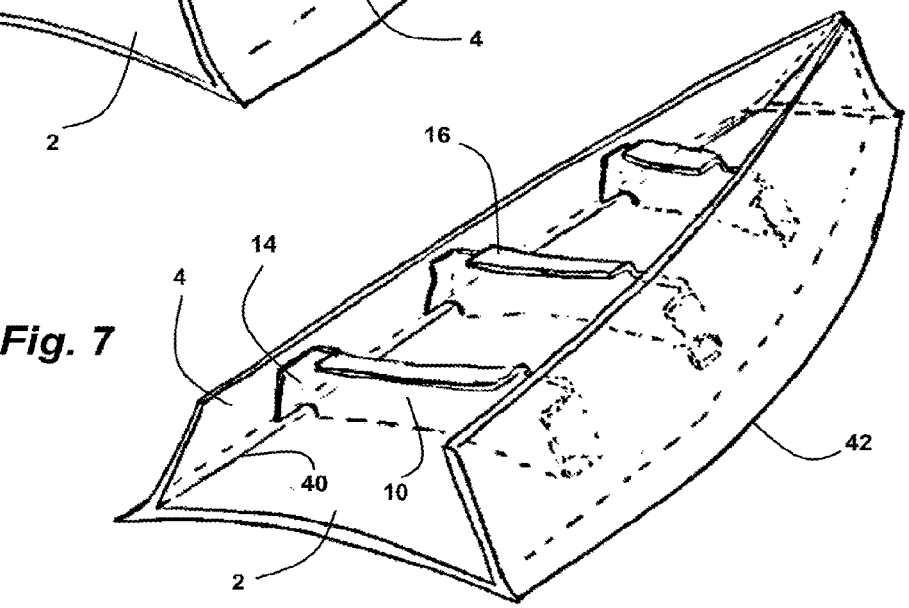

REAR FAIRING FOR A TURBOJET ENGINE PYLON MADE OF COMPOSITE MATERIALS

CROSS-REFERENCE TO RELATED APPLICATIONS

This application is a continuation of International Application No. PCT/FR2018/050443, filed on Feb. 23, 2018, which claims priority to and the benefit of FR 17/51461 filed on Feb. 23, 2017. The disclosures of the above applications are incorporated herein by reference.

FIELD

The present disclosure relates to a rear fairing of a suspension pylon of an aircraft turbojet engine, as well as a nacelle including such a rear fairing.

BACKGROUND

The statements in this section merely provide background information related to the present disclosure and may not constitute prior art.

The rear fairing of a suspension pylon, also referred to by the acronym "APF" (standing for "aft pylon fairing"), is installed in the downstream continuation of the pylon and the hot gas ejection nozzle of a bypass turbojet engine. The turbojet engine can be disposed below or above the wing of the aircraft, in both cases it is supported by a pylon equipped with a rear fairing.

A known type of rear fairing of a suspension pylon for a bypass turbojet engine, presented in particular by the document EP-A2-2583900, forms a box comprising a main structure extending in the longitudinal direction of the turbojet engine. The box includes lateral walls, connected by connecting means to a floor forming a thermal protection disposed above the nozzle for ejecting hot gases exiting the turbojet engine.

The means for connecting the floor on the main structure include a set of tabs oriented substantially perpendicular to this floor, allowing accompanying a displacement of the floor during the differential thermal expansions between the different elements.

It should be noted that the lower surface of the floor can be subjected to high temperatures, in the range of 600 to 800° C. locally, while the lateral walls on the flanks of the fairing are subjected to much lower temperatures. The differences in temperature between the different elements of the fairing, as well as the expansions generated by these temperatures, are then considerable.

This type of fairing is generally made of metal materials, for example using a nickel alloy for the aerodynamic surfaces, and a titanium alloy for the structural elements. A fairing which is relatively heavy and having significant differential thermal expansion has issues due to the high thermal gradients and the differences in the coefficient of expansion of the different used materials.

In addition, the fairing is subjected to high vibrations, due in particular to the turbulences of the ejected gases, which cause fatigue work of the materials.

Moreover, a known thermal shield type for a turbojet engine nacelle, presented in particular by U.S. Pat. No. 7,943,227, includes a cambered panel made of a ceramic matrix composite material, referred to by the acronym "CMC," comprising superimposed fabric layers constituting a preform, which is then impregnated with a ceramic matrix.

Compared to the metal materials, the ceramic matrix composite materials CMC are much lighter, and have reduced thermal expansions.

Nonetheless, this type of ceramic matrix composite material CMC has weak mechanical characteristics between the different fabric layers of the preform. Therefore, there may be issues of delamination of the layers therebetween affecting the mechanical strength of the fairing subjected to mechanical stresses and to vibrations which may be significant.

SUMMARY

The present disclosure provides a rear fairing for a pylon holding an aircraft turbojet engine, intended to form an aerodynamic surface covering the base of the pylon, the rear fairing extending in the longitudinal direction and comprising a floor intended to be disposed facing the hot gas exiting the turbojet engine, and lateral walls constituting aerodynamic surfaces, characterized in that the floor and the lateral walls include ceramic matrix composite materials made from preforms formed of superimposed layers of warp or weft threads. The preforms have inter-layer weaving threads connecting the layers to each other. The preform includes, in one single piece, the floor and the lateral walls which extend from each other by folds at least partially forming sharp edges protruding outwardly of the lateral walls.

An advantage of the rear fairing is that it has the lightness of the ceramic matrix composite material as well its good resistance to different chemical agents, while adding a high mechanical strength thereto, minimizing the risk of delamination of the layers therebetween, thanks to the weaving of the preform comprising inter-layer connecting threads, such as an orthogonal or layer-to-layer three-dimensional "3D" weaving, also called "interlock" weaving.

The sharp edges allow separating the combustion hot gas flow from the secondary fresh air flow.

The rear fairing according to the present disclosure may include one or more of the following features, which may be combined with each other.

According to one particular technical feature, the superimposed layers of longitudinal warp or weft threads forming the preform are connected to each other with different transversely disposed inter-layer weaving threads, which vary by taking different superimposed columns of longitudinal warp or weft threads, depending on the position in the longitudinal direction.

According to another advantageous feature, the different superimposed layers of longitudinal warp or weft threads of the external edges are connected to each other as well as to the floor by transverse inter-layer weaving threads, and the longitudinal superimposed warp or weft threads of the floor are connected to the superimposed warp or weft threads of the lateral walls by inter-layer weaving threads such that all longitudinal fibers of the different floor, lateral walls and external edges form a single preform.

In particular, the rear fairing may include transverse partitions fastened on the floor.

Advantageously, the transverse partitions have a preform which is formed integrally with the preform of the floor. A significant interlocking of the transverse partitions with the floor is obtained.

In this case, the preform of the floor may include, on the top, a distinct portion intended to constitute the transverse partitions, which is connected to the preform of the floor by transverse folding lines.

According to one form, the preform includes, in one single piece, the floor and the lateral walls which extend from each other by folds forming rounded edges.

In the case where the preform includes, in one single piece, the floor and the lateral walls which extend from each other by folds at least partially forming sharp edges protruding outwardly from the lateral walls, the preform advantageously includes on each side outwardly of a folding line directly connecting the floor to the lateral wall, a protrusion made in the continuity of the floor, below the lateral wall.

In particular, the fairing may include in the longitudinal direction, an assembly comprising the floor and lateral walls, which is formed by several portions attached together. This arrangement allows making shorter parts.

In this case, advantageously, a fairing portion has one connection end to another fairing portion, which comprises a part which is setback inwardly of the fairing, and superimposed inside the other fairing portion. In this manner, a nesting is made allowing forming an aerodynamic external surface which remains smooth.

Advantageously, aerodynamic surfaces of the fairing include an acoustic treatment.

In particular, the preforms may be mainly woven of aluminum oxide, aluminosilicates, silicon carbide or carbon fibers, with each of these elements or with these elements in combination.

The present disclosure also relates to a turbojet engine nacelle for an aircraft, characterized in that it includes a rear fairing covering the base of a pylon for connection with the aircraft, according to any one of the preceding features.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 shows a woven preform for a fairing according to the present disclosure;

FIG. 6 shows a rear fairing with sharp edges between the floor and the lateral walls according to the present disclosure;

FIG. 6a is a detail cross-sectional view of FIG. 6 showing a sharp edge for separating the flows connecting the floor to the lateral walls;

FIG. 7 shows a rear fairing with sharp edges between the floor and lateral walls and further including transverse partitions according to the present disclosure;

Figure 1:
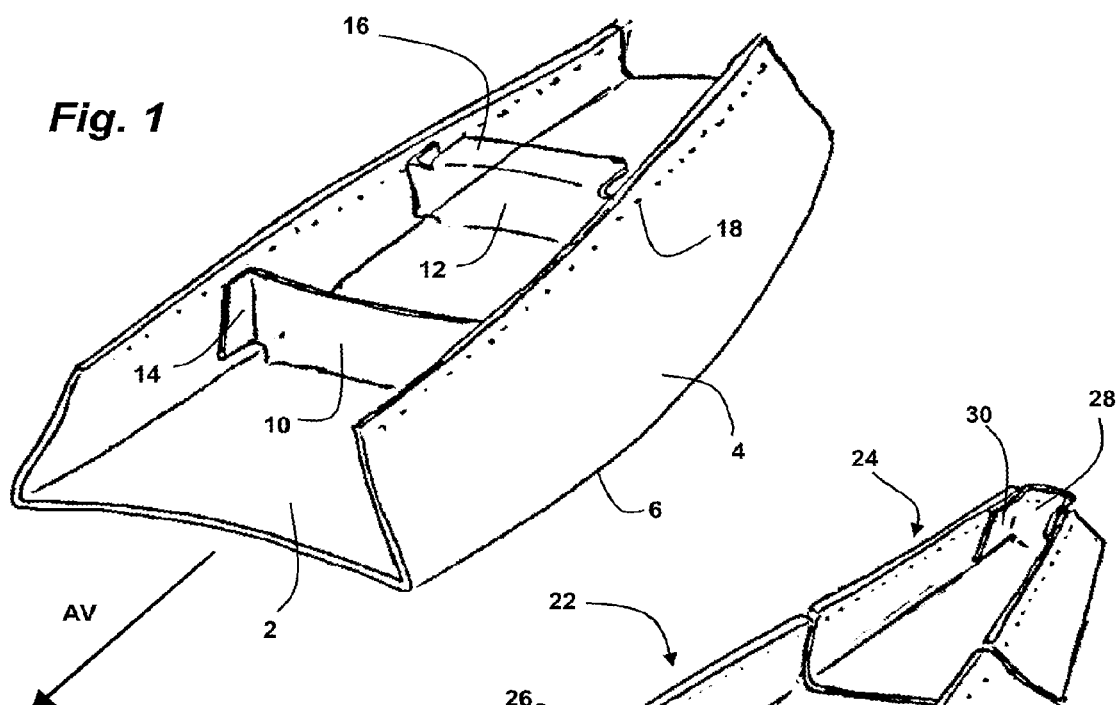
FIG. 1 shows a rear fairing according to one variant of the present disclosure with rounded edges between the floor and the lateral walls.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The different figures presented hereinafter illustrate different possible options for making the fairing according to the present disclosure, which may be mixed with each other in any possible manner.

Figure 3:
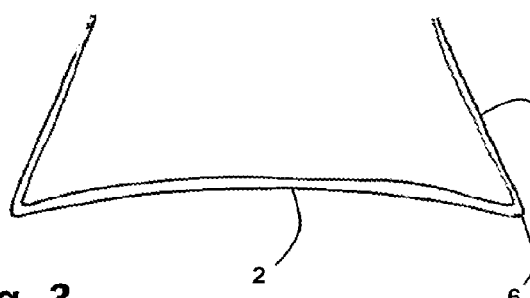
FIG. 3 is a cross-sectional view of the rear fairing of FIG. 1.

FIGS. 1 and 3 show a rear fairing intended to be disposed along a longitudinal axis of a bypass turbojet engine nacelle, at the base of a pylon supporting the turbojet engine, including a front side indicated by the arrow "AV."

The rear fairing includes a substantially flat floor 2, directly extending, on each side from a fold forming a rounded edge 6, to a lateral wall 4 in longitudinal elevation with respect to the floor, to form aerodynamic external surfaces guiding the gas flows. In particular, the floor 2 guides below the hot gases exiting the turbojet engine, and the lateral walls 4, the cold air coming from the bypass flow.

The lateral walls 4 as well as the floor 2 are formed from one single woven preform, bent on both sides in order to form the lateral walls 4 extending to the floor 2 by a rounded edge 6 which separates the hot gas flows circulating under the floor of cold air flows circulating on the sides of the lateral walls.

Each lateral wall 4 includes in the upper portion a row of bores 18 disposed parallel to the upper border of the wall, constituting fasteners of the rear fairing to the pylon.

The rear fairing includes, thereinside, two transverse partitions 10, 12 forming transversely disposed vertical elevations, each connecting both the floor 2 and the two lateral walls 4.

The two transverse partitions 10, 12 include, at their ends, bent flanges 14, folded down parallel to the surfaces of the lateral walls 4. The rear transverse partition 12 includes a bent upper flange 16 parallel to the floor 2, which is intended to be assembled and fastened under the pylon.

The flaps of the ends of the partitions 10, 12 bent on the lateral walls 4 may be reinforced by fibers added between the portions of the preforms arranged opposite to each other, in order to produce a fibrous connection between these preforms thus reducing the risk of delamination. The layers of these fibers may be inserted by a sewing method including a thread on one side, called "tufting," or a thread on each side, called "stitching," before the curing of the preform by the matrix.

Figure 2:
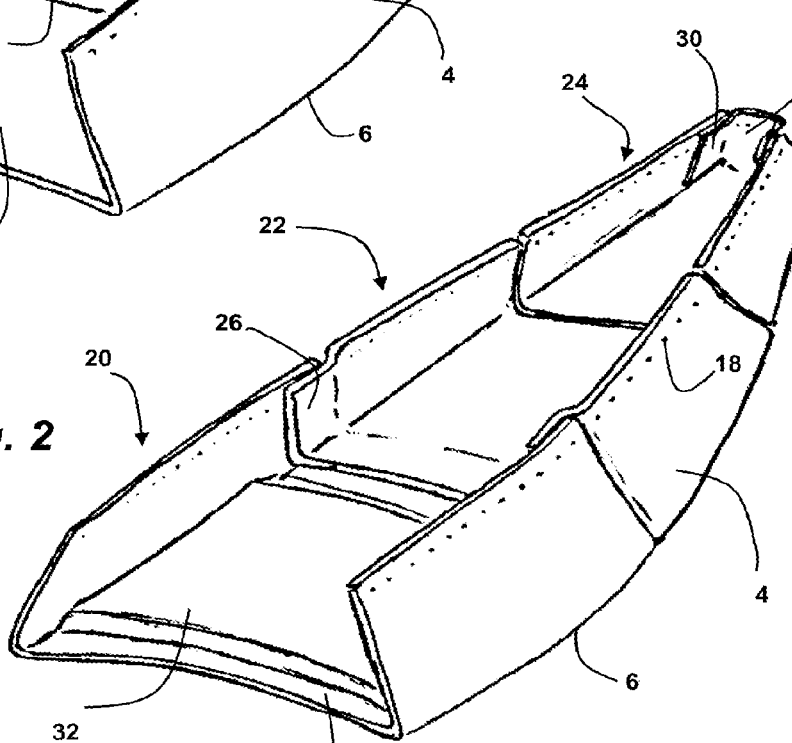
FIG. 2 shows a rear fairing according to another variant of the present disclosure with rounded edges between the floor and the lateral walls.
Figure 4:
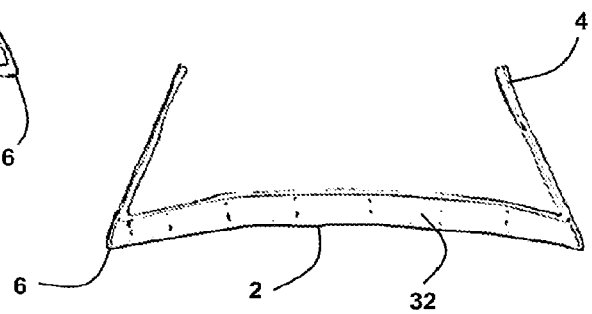
FIG. 4 is a cross-sectional view of the rear fairing of FIG. 2 having an acoustic floor according to the present disclosure.

FIGS. 2 and 4 show a rear fairing successively including, in the longitudinal direction, three portions 20, 22, 24 each comprising a floor 2 directly extending to the lateral walls 4 by rounded edges 6, using the same bent preform.

The fairing central portion 22 has on the front side, over a small length, a connection end 26 slightly setback inwardly of the fairing, over a constant thickness, which is superimposed inside the rear side of the fairing front portion 20 to be fastened thereon.

In this manner, a large connecting surface is obtained between the front portion 20 and the fairing central portion 22, providing a continuity of the external aerodynamic surfaces of the fairing at the level of the connection between these two portions. In addition, a mechanical continuity between the two portions 20, 22 is provided by a bonding method such as the insertion of fibers connecting the two preforms before the curing, the bonding of the two preforms during the curing, or else the assembly by through fasteners between the two parts.

The fairing central portion 22 is connected to the fairing rear portion 24 by a border-to-border connection, which may include thereinside fasteners between these two portions, in particular strips bonded astride on these two portions.

The fairing rear portion 24 terminating rearwardly in a tightened manner includes a vertical rear partition 28 which closes the rear end of the fairing, having on each side a folded border 30 inwardly of the lateral wall 4. The folded border 30 may be, depending on the need, reinforced by fibers connecting each border with the preform of the rear portion 24, bonded with the preform during the curing, or assembled by through fasteners.

The floor 2 of each fairing portion 20, 22, 24 includes an acoustic area 32 sandwiched in the thickness of the floor, having perforations of its aerodynamic surface opening inside the cavities, such as for example a honeycomb structure, in order to achieve an attenuation of acoustic frequencies.

FIG. 5 shows a three-dimensional woven preform, for a fairing without internal stiffeners, with weft and warp of the weaving which may be set in the longitudinal or transverse direction.

A fold of the preform along the folding lines 40 separating the floor 2 from the lateral walls 4 is made with a radius to form the rounded edges 6 presented in the examples above.

FIGS. 6 and 6a show a fairing comprising a fold along folding lines 40 which are inside the fairing.

In addition, along each folding line 40, a sharp edge 42 turned outwards is formed by protruding outwardly from the lateral walls 4 over a width L. A connection of the floor 2 is obtained with each lateral wall 4 having a "Y" shaped section having a sharp edge 42 turned outwards, separating the hot gas flow from the cold air flow.

FIG. 7 shows a fairing, similar to that shown in FIG. 6, further including a succession of three parallel transverse partitions 10, each having at the ends of the bent edges 14 fastened inside the lateral walls 4, and above a bent upper edge 16 parallel to the floor 2, intended to be fastened under the pylon.

Figure 8:
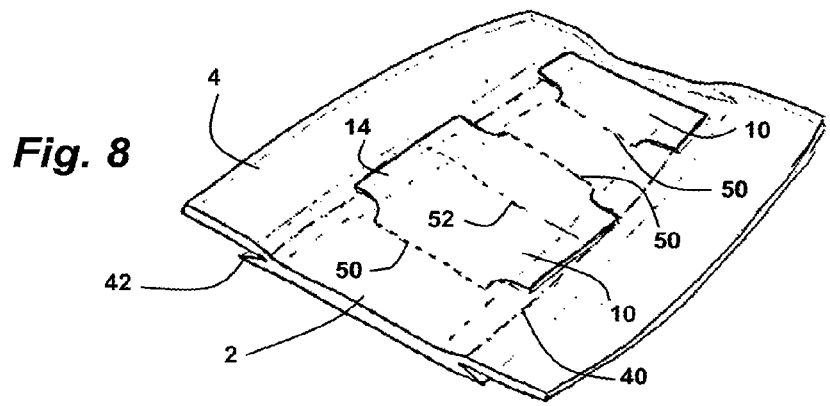
FIG. 8 shows a preform intended to form the fairing shown in FIG. 7.
Figure 9A:
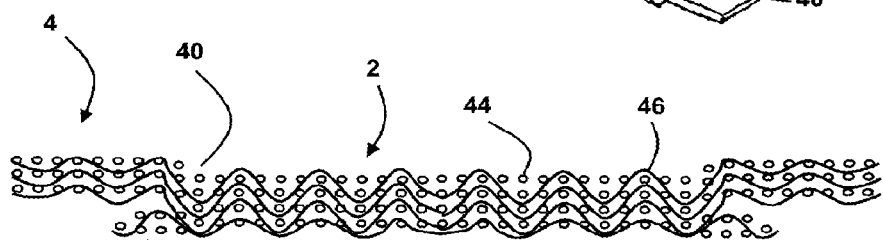
FIGS. 9a and 9b show cross sections of a preform showing inter-layer weaving threads according to the present disclosure.
Figure 9B:
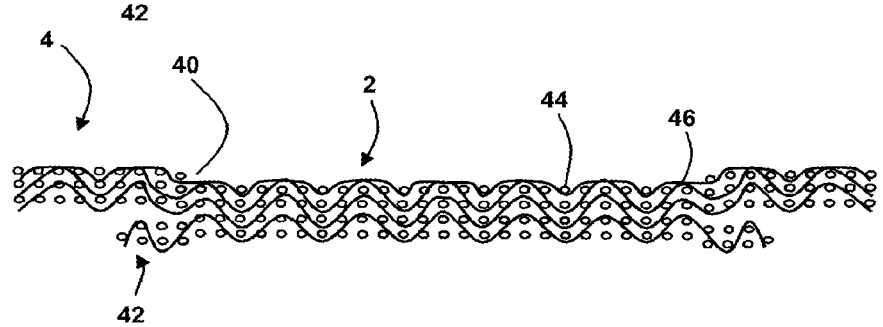

FIGS. 8, 9a and 9b show a preform comprising, in a cross-section, the floor 2 extending, on each side to the lateral walls 4, from folds formed along the folding lines 40.

A protrusion of the preform is made in the continuity of the floor 2 outside each folding line 40, below the lateral walls 4, to form the external edges 42.

FIG. 8 shows the preform including, on the top, distinct portions intended to constitute the transverse partitions 10, which are extending to the preform of the floor 2 by transverse folding lines 50.

The distinct portion disposed on the rear side, extending forwardly by a transverse folding line 50 to the floor 2, is straightened to form a transverse partition 10.

The distinct portion disposed on the front side, extending forwardly and rearwardly by a transverse folding line 50 to the floor 2, is cut along a cross-sectional line 52. Each side is then straightened along its folding line 50 to form a transverse partition 10.

Each end of the transverse partitions 10 is intended to be bent up by forming a bent border 14 to be pressed inside a lateral wall 4.

The superimposed layers of longitudinal warp or weft threads 44 shown by FIGS. 9a and 9b constituting the preform are connected to each other with different transversely disposed inter-layer weaving threads 46, which vary by taking different columns of longitudinal threads, according to the position in the longitudinal direction as shown in these figures.

It should be noted that the different layers of longitudinal threads 44 of the external edges 42 are connected to each other as well as to the floor 2 by transverse inter-layer weaving threads 46, and that the longitudinal threads of the floor are also connected to the longitudinal threads of the lateral walls 4 by these inter-layer weaving threads. In this manner, via different transverse fibers of the interlayer weaving threads 46, all longitudinal fibers of the different floor 2, lateral wall 4 and outer edge 42 areas are connected together in one single preform 5.

In general, the elevations 10 formed inside the fairing may be made by preform portions formed during the weaving of the general preform comprising the floor 2 and the lateral walls 4, or affixed by an additional seam on the general preform.

Figure 10:
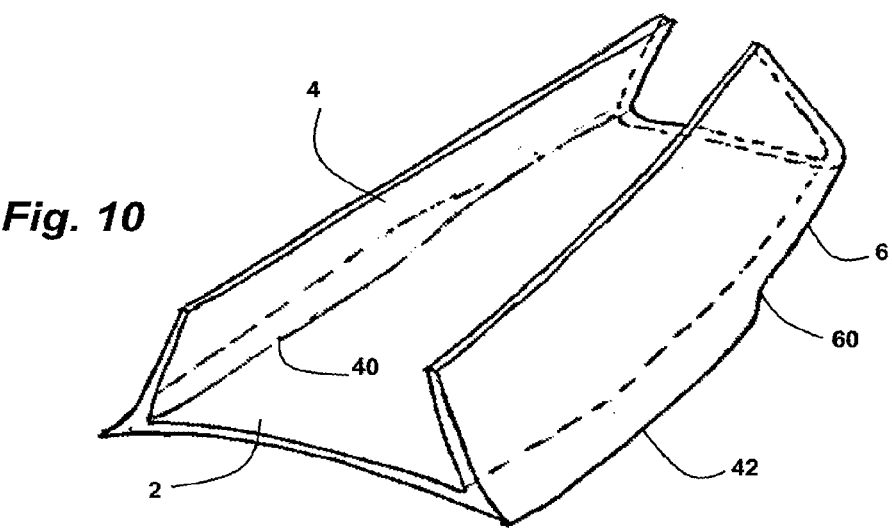
FIG. 10 shows a rear fairing according to a variant with rounded edges then sharp edges between the floor and the lateral walls according to the present disclosure.

FIG. 10 shows a rear fairing including in its front portion on each side an external sharp edge 42 connecting the floor 2 to the lateral walls 4, which gradually becomes, starting from a transition point 60, a rounded edge 6. For this purpose, a preform is made, having in the length a transition of the weaving of the layers forming at the beginning the external sharp edge 42, then removing it subsequently 15 to obtain the rounded edge 6.

A rear fairing of a pylon, is made in a simple and cost-effective manner with composite materials CMC comprising a preform greatly reinforced by the three-dimensional weaving connecting the different layers to each other, having a reduced number of components, presenting at the same time a good resistance to temperature, a low coefficient of thermal expansion and a homogeneity of this coefficient throughout the entire part, limiting the elongation issues related to the thermal gradient. A mechanical robustness of the assembly is thus provided.

For the making of the preforms, ceramic fibers such as aluminum oxides and/or aluminosilicates may be used, which will be associated with an alumina and/or aluminosilicate powder matrix. It is also possible to use carbon fibers associated with geopolymer matrices resistant to high temperatures. It is also possible to consider using silicon carbide SiC ceramic fibers associated with a silicon carbide SiC matrix.

The preforms may also be made by combining different ones of these fibers together, providing the coherence with the matrix.

In addition, the composite materials CMC have a chemical inertia against the oxidizing atmospheres of the combustion gases and the rejection of the turbojet engine fluid. Moreover, an acoustic treatment of the walls may be easily provided.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A rear fairing for a pylon holding an aircraft turbojet engine and forming an aerodynamic surface covering a base of the pylon, the rear fairing extending in a longitudinal direction and comprising:
    a floor facing a hot gas exiting the turbojet engine; and
    lateral walls extending to the floor, the lateral walls forming aerodynamic surfaces,
wherein the floor and the lateral walls include ceramic matrix composite materials made from preforms formed of superimposed layers of warp or weft threads, the preforms having inter-layer weaving threads connecting the superimposed layers to each other,
wherein the preforms form, in one single piece, a structure in which the floor and the lateral walls meet each other at folds to form a Y-shaped section having a sharp edge turned outwards and configured to separate flow of the hot gas from a cold air flow.

2. The rear fairing according to claim 1, wherein the warp or weft threads forming the preform are disposed in columns extending in the longitudinal direction, and the superimposed layers of the warp or weft threads forming the preform are connected to each other with different transversely disposed inter-layer weaving threads, which connect different columns of the warp or weft threads, along the longitudinal direction.

3. The rear fairing according to claim 1, wherein:
    the different superimposed layers of warp or weft threads forming the edges are connected to each other and the floor by transverse inter-layer weaving threads, and
    the superimposed layers of warp or weft threads of the floor are connected to the superimposed layers of warp or weft threads of the lateral walls by inter-layer weaving threads such that the warp or weft threads of the floor, the lateral walls, and the edges form a single preform.

4. The rear fairing according to claim 1 further comprising transverse partitions fastened on the floor.

5. The rear fairing according to claim 4, wherein the transverse partitions are made from a preform integrally formed with the preform of the floor.

6. The rear fairing according to claim 5, wherein on a top of the preform of the floor includes transverse partitions, which are connected to the preform of the floor by transverse folding lines.

7. The rear fairing according to claim 1, wherein the preforms form, in one single piece, the floor and the lateral walls which extend from each other by folds forming rounded edges.

8. The rear fairing according to claim 1, wherein the preform of the floor includes, on each side outwardly of a folding line directly connecting the floor to the lateral wall, a protrusion made in continuity of the floor, below the lateral wall.

9. The rear fairing according to claim 1 further comprising, in the longitudinal direction, an assembly comprising the floor and the lateral walls, which is formed by several fairing portions attached together.

10. The rear fairing according to claim 9, wherein a first fairing portion has a connection end setback inwardly of the first fairing portion and superimposed inside a second fairing portion.

11. The rear fairing according to claim 1, wherein the aerodynamic surfaces include an acoustic processing.

12. The rear fairing according to claim 1, wherein the preforms are woven of aluminum oxide fibers, aluminosilicates fibers, silicon carbide fibers, carbon fibers, or combinations thereof.

13. A turbojet engine nacelle for an aircraft, the turbojet engine nacelle comprising a rear fairing according to claim 1 covering a base of a pylon for connection with an aircraft.

14. A rear fairing for a pylon holding an aircraft turbojet engine and forming an aerodynamic surface covering a base of the pylon, the rear fairing extending in a longitudinal direction and comprising:
    a floor facing a hot gas exiting the turbojet engine;
    lateral walls extending to the floor, the lateral walls forming aerodynamic surfaces directing a cold air flow; and
    a Y-shaped section including a leg extending from the floor and the lateral walls, the leg defining an edge turned outwards and configured to separate flow of the hot gas from the cold air flow,
wherein the floor and the lateral walls include ceramic matrix composite materials made from preforms formed of superimposed layers of warp or weft threads, the preforms having inter-layer weaving threads connecting the superimposed layers to each other.

* * * * *